(12) United States Patent
Maeder et al.

(10) Patent No.: US 9,649,804 B2
(45) Date of Patent: May 16, 2017

(54) APPARATUS FOR PRODUCING FLAT-WEB PRODUCTS, AND METHOD FOR SETTING IT UP

(71) Applicants: Reto Maeder, Buochs (CH); Robert Maeder, Buochs (CH)

(72) Inventors: Reto Maeder, Buochs (CH); Robert Maeder, Buochs (CH)

(73) Assignee: Maku AG, Buochs (CH)

( * ) Notice: Subject to any disclaimer, the term of this patent is extended or adjusted under 35 U.S.C. 154(b) by 408 days.

(21) Appl. No.: 13/870,498

(22) Filed: Apr. 25, 2013

(65) Prior Publication Data

US 2013/0334730 A1  Dec. 19, 2013

(30) Foreign Application Priority Data

Apr. 25, 2012  (EP) .................................. 12 002 894

(51) Int. Cl.
| | |
|---|---|
| *B29C 47/12* | (2006.01) |
| *B29C 47/08* | (2006.01) |
| *B29C 47/16* | (2006.01) |
| *B29C 47/92* | (2006.01) |
| *B29C 47/00* | (2006.01) |

(Continued)

(52) U.S. Cl.
CPC ........ *B29C 47/124* (2013.01); *B29C 47/0806* (2013.01); *B29C 47/0864* (2013.01); *B29C 47/0867* (2013.01); *B29C 47/16* (2013.01); *B29C 47/0021* (2013.01); *B29C 47/92* (2013.01); *B29C 2049/0036* (2013.01); *B29C 2947/9298* (2013.01); *B29C 2947/92485* (2013.01); *B29C 2947/92647* (2013.01);

(Continued)

(58) Field of Classification Search
CPC ... B29C 47/124; B29C 47/16; B29C 47/0806; B29C 47/0867; B29C 47/0021
USPC .................. 264/176.1, 177.16; 425/141, 466
See application file for complete search history.

(56) References Cited

U.S. PATENT DOCUMENTS

| | | | | |
|---|---|---|---|---|
| 3,555,602 | A | * | 1/1971 | Bourgeois ............... B29C 47/22 425/107 |
| 3,985,845 | A | | 10/1976 | Akatsuka et al. |

(Continued)

FOREIGN PATENT DOCUMENTS

| | | |
|---|---|---|
| CH | 702 058 A1 | 4/2011 |
| DE | 12 02 973 B | 10/1965 |

(Continued)

OTHER PUBLICATIONS

European Search Report of corresponding European Application No. 12 002 984 dated Sep. 3, 2012.

(Continued)

*Primary Examiner* — Nahida Sultana
(74) *Attorney, Agent, or Firm* — Fay Sharpe LLP (57) ABSTRACT

An apparatus for producing flat-web products includes a slot die of which the gap and/or restrictor bar can be set via screws. At least one screwing device is provided for setting the screws, the screwing device including a cross member on which the screwing device can be moved to an fro. The cross member is fixably connected to the slot die on one side of the slot die. The apparatus has at least one bearing arrangement on the other side of the slot die. The at least one bearing arrangement permits a relative movement between the slot die and the cross member.

16 Claims, 9 Drawing Sheets

(51) Int. Cl.
*B29L 7/00* (2006.01)
*B29C 49/00* (2006.01)
*B29K 101/12* (2006.01)

(52) U.S. Cl.
CPC ..... *B29K 2101/12* (2013.01); *B29L 2007/002* (2013.01); *B29L 2007/008* (2013.01)

(56) References Cited

U.S. PATENT DOCUMENTS

| | | | |
|---|---|---|---|
| 4,439,125 A | | 3/1984 | Dieckmann et al. |
| 4,978,289 A | * | 12/1990 | Maejima ............ B29C 47/0021 425/141 |
| 5,020,984 A | * | 6/1991 | Cloeren ............... B29C 47/165 264/40.1 |
| 5,120,212 A | * | 6/1992 | Reiber ............... B29C 47/0023 425/141 |
| 5,549,014 A | * | 8/1996 | Cuneo .................... B23Q 5/40 74/89.33 |
| 5,888,556 A | * | 3/1999 | Cloeren ............. B29C 47/0021 425/141 |
| 6,344,088 B1 | * | 2/2002 | Kamikihara .......... B05C 5/0254 118/411 |
| 6,709,255 B2 | * | 3/2004 | Kappes et al. ............. 425/133.1 |
| 6,799,961 B1 | * | 10/2004 | Freynhofer ........... B05C 5/0262 425/141 |
| 6,805,543 B2 | * | 10/2004 | Fux et al. ................. 425/133.1 |
| 6,896,504 B2 | * | 5/2005 | Horna et al. ............... 425/133.1 |
| 2001/0015814 A1 | * | 8/2001 | Kawasaki ............... B41J 19/20 358/1.8 |
| 2005/0238473 A1 | * | 10/2005 | Schmeink ............. B21D 43/05 414/729 |

FOREIGN PATENT DOCUMENTS

| | | | | |
|---|---|---|---|---|
| DE | 17 79 546 A1 | | 9/1971 | |
| DE | 1779546 A1 | * | 9/1971 | ............ B29C 47/00 |
| DE | 38 05 774 A1 | | 9/1989 | |
| DE | 3805774 A1 | * | 9/1989 | ............ B29C 47/16 |
| DE | 10 2007 030369 A1 | | 1/2009 | |
| EP | 0 035 356 A1 | | 9/1981 | |
| EP | 0 079 052 A2 | | 5/1983 | |
| EP | 0 330 603 A2 | | 8/1989 | |
| EP | 2 444 229 A1 | | 4/2012 | |
| JP | 50 041957 A | | 4/1975 | |
| JP | 51 060252 A | | 5/1976 | |
| JP | 53 045364 A | | 4/1978 | |
| JP | 54 169174 A | | 11/1979 | |
| JP | 54 153877 A | | 12/1979 | |

OTHER PUBLICATIONS

European Search Report of related European Application No. 10 01 3916 dated Apr. 1, 2011.

\* cited by examiner

APPARATUS FOR PRODUCING FLAT-WEB PRODUCTS, AND METHOD FOR SETTING IT UP

The invention relates to an apparatus for producing flat-web products, having a slot die, the gap and/or restrictor bar of which can be set by means of screws, at least one screwing device for setting the screws, and having a crossmember, on which the screwing device can be moved to and fro.

Furthermore, the invention is directed to a method for setting up an apparatus for producing flat-web products.

In particular, plastic films, but also, for example, metal or glass, come into consideration as flat-web products. For reasons of simplification, reference is made in the following text mainly to plastic films.

It is known to extrude plastic films in film extrusion plants. In the latter, thermoplastic is first of all brought to an increased temperature until it softens. The softened plastic exits out of the gap of a slot die which brings the plastic material into sheet form. In order to cool the film material, a cooling-roll arrangement which comprises one or more cooling rolls can be provided downstream of the slot die.

The aim is to produce a film web which is equally thick as far as possible over the entire width. This is particularly important in the case of thin films. To this end, the slot die has screws which are distributed over its width and by way of which the height of the die gap can be set. In addition to the precision adjusting of the cross-sectional profile of the flat-web product, the gap also has to be adapted to the respectively new product in the case of a product change. The screws therefore fulfil the function both of precision setting and of adaptation to different products.

In addition, or as an alternative in exceptional cases, what is known as a restrictor bar can be provided which is arranged within the slot die and ensures a distribution of the softened plastic over the width of the slot die. The restrictor bar can likewise be set via setting screws, the flow cross section towards the gap being changed by an adjustment of the restrictor bar via the setting screws. As a result of this, the film profile can likewise be influenced.

The screwing in order to set the gap or the restrictor bar of the slot die takes place, for example, by hand. Setting of this type is inexpensive, but impractical and slow for adapting the film cross section during running operation. The material loss which is induced by the manual setting during the running process can be very high. In addition, a manual adaptation in the case of a product change can likewise take a considerable amount of time. This in turn means a loss of production during the downtime of the apparatus.

As an alternative to manual setting of the screws, it can be provided that each screw is assigned a screwing device. The advantages are obvious. Both rapid regulation and rapid changeover to new product parameters are possible. However, a substantial disadvantage consists in that the screwing devices are expensive. If one considers that a slot die can certainly have a width of up to 3 m and the screw spacing is typically approximately 25 mm, it becomes clear that a considerable number of screwing devices are required, in order to set all the screws by means of stationary screwing devices.

A slot die is known from practice, in which merely one screwing device is used to set the screws of the die gap. The screwing device can be moved to and fro along a crossmember. A solution of this type has in principle the advantage of rapid setting of the screws and is at the same time considerably less expensive than equipping the slot die with a multiplicity of stationary screwing devices. In addition, there is the advantage that the known solution can be retrofitted. Existing slot dies without automatic adjustability of the screws can therefore be complemented by the crossmember with the screwing device and fully automatic systems are provided as a result. However, practice shows that not all screws can be actuated readily in a reliable manner by way of a single screwing device. Faulty actuations can occur.

Proceeding from the known prior art, the invention is based on the object of providing an apparatus of the generic type for producing flat-web products, by way of which apparatus reliable setting of all the screws is possible.

In order to achieve this object, the apparatus which was mentioned at the outset is distinguished according to the invention by the fact that the crossmember is connected fixedly to the slot die on one side of the slot die, and that the apparatus has at least one bearing arrangement on the other side of the slot die, which at least one bearing arrangement permits a relative movement between the slot die and the crossmember.

The invention is based on the finding that one essential reason for the faulty actuation of known systems lies in the fact that displacements of the screw positions occur as a result of temperature fluctuations. In addition, temperature-induced stresses can occur between the slot die and the crossmember.

This is where the invention comes into action.

According to the invention, it is provided that the crossmember is secured fixedly on the slot die on one side of the slot die. On its other side, in contrast, a relative movement is possible between the slot die and the crossmember as a result of the bearing arrangement. This means that temperature-induced expansions are possible as a result of the invention without stresses occurring. Tests have shown that the expansion in length between the cold state of the slot die at room temperature and the operating state can be of the order of magnitude of 1.5 mm per meter. In the case of a die width of 3 m, the expansion is accordingly 4.5 mm. This leads to reliable and exact actuation of the screws being made considerably more difficult, if not being totally impossible, in the case of conventional apparatuses.

Moreover, the invention provides a defined expansion to the extent that the crossmember is connected to the slot die in a stationary manner on one side. No relative movement between the die and the crossmember therefore takes place here in the case of heating. An expansion relative to the crossmember takes place exclusively in the direction of the other side. This permits reliable detection of the expansion, as will be described in further detail in the following text.

An essential aspect in the concrete refinement is given to the connection of the crossmember on the slot die. The said connection has to firstly permit a relative movement between the die and the crossmember and secondly has to be configured to be stable enough to support the weight of the crossmember and the forces which occur during the screwing operation. At the same time, the crossmember has to be held in a positionally stable manner, even in the case of a relative movement. To this extent, it is considered to be particularly advantageous that the bearing arrangement has at least one supporting device which is expediently assigned to the slot die. The supporting device is preferably connected releasably to the slot die, for easy assembly or dismantling.

The supporting device preferably permits exclusively a relative movement in the axial direction of the supporting device.

One advantageous embodiment of the invention is distinguished by the fact that the supporting device is configured as a bearing journal, on which the crossmember is mounted. A bearing journal of this type meets the requirements for a simple, precise and stable construction in an excellent manner. For stability and rigidity reasons, in particular, two bearing journals can be provided which are capable in an even more satisfactory manner than one bearing journal of absorbing the forces which occur.

It can advantageously be provided that the crossmember preferably has a lateral holder on both sides, and that the supporting device (or the bearing journal or journals) preferably engages/engage through the holder. This ensures a particularly stable construction. The bearing journals preferably have a round cross section and interact with a sliding bearing which is assigned to the holder of the crossmember, in particular is fastened to the holder.

One advantage of the invention comprises the ability to retrofit plants which already exist. It can likewise be advantageous to remove the crossmember according to the invention in its entirety, for example for inspection or cleaning purposes. To this extent, it is proposed in one substantial development of the invention that the supporting device is connected releasably to the slot die. In order to remove the crossmember, the supporting device can advantageously be detached from the slot die and the entire arrangement can be removed.

The supporting device preferably has a first holding device. The first holding device can be fastened releasably to the slot die, directly or indirectly. The supporting device or, in the concrete preferred case, the bearing journal can be shrink-fitted, welded or screwed into the holding device, for example. In order to dismantle the crossmember, the supporting device or its holding device is detached. Here, the supporting device can remain in the bearing arrangement. The assembly can take place in such a way that the supporting device is first of all brought into engagement with the crossmember or its holder and subsequently the first holding device is fastened to the slot die or a second holding device which is assigned to the latter.

One preferred embodiment of the invention is distinguished by the fact that the first holding device is arranged at a spacing from the slot die. This means that the supporting device is arranged at a spacing from the slot die, as is considered per se to be particularly preferred. In particular, the first holding device can be held at a spacing from the slot die by a spacer element, for example pins or spacer sleeves. The spacing has the essential advantage that the screwing device can be moved as far as the outermost screw. There is sufficient space for this as a result of the spacing of the first holding device from the slot die. A further advantage of the spacing comprises protection of the crossmember and its attachments against overheating.

The first holding device preferably interacts with a second holding device which is fixed on the slot die. In particular, the first holding device can be fastened to the second holding device. A construction of this type permits advantageous assembly and dismantling of the crossmember. This is the case, above all, when both holding devices are of plate-like configuration at their mutual interface, as is advantageously proposed.

The first holding device can advantageously be adjusted or displaced with respect to the second holding apparatus. An adjustment of this type serves to orient the screwing device in relation to the screws, and therefore ensures reliable engagement of the screwing device over the entire width of the slot die.

In addition, the crossmember will analogously also be adjustable on its stationary side. Here, the adjusting option can be configured in such a way that the second holding device and the holder together form an adjusting device. This can take place, for example, according to the tongue and groove principle. It can thus be provided that the second holding device has a groove and the holder has a tongue which interacts with the groove, or vice versa. It is considered to be particularly advantageous if the adjustment takes place via an adjusting screw which engages either into the second holding device or the holder.

The adjustment preferably takes place in the horizontal plane.

On that side, on which a relative movement is possible between the slot die and the crossmember or its bearing arrangement, it is expediently provided that the second holding device is fastened to the first holding device. In particular, it can be provided that the first and the second holding device can be moved relative to one another. This is the case, for example, when both holding devices together form an adjusting device, in which the first holder preferably has a groove and the second holder has a tongue, or vice versa.

In one essential development of the invention, it is proposed that the screwing device is fixed on a carriage which can be moved along a linear guide of the crossmember. The linear guide can be a rolling guide, that is to say a guide with rolling bodies. This permits a low-friction movement along the rails. At the same time, the linear bearings are dimensioned in such a way that they can satisfactorily absorb the weights and the loads in the case of the individual screwing operations.

The drive of the carriage of the screwing device takes place, for example, via a gearwheel drive which is assigned to the carriage and is in engagement with a stationary rack which is assigned to the slot die. One advantage of a drive of this type is its robustness.

It has been found, however, that a very much "lighter" drive is also possible, in which the carriage can be driven via a toothed belt, as is considered to be particularly advantageous. Here, the actual drive is seated, for example, on the crossmember, and therefore does not have to move with it during the movement of the screwing device. The moving masses can therefore be kept low. The toothed belt can comprise carbon for improved heat resistance.

The carriage can be moved along the linear guide over the width of the slot die. This is as a rule a horizontal orientation. For the advancing movement on to the screws, it is advantageously provided that the carriage has a second linear guide, by way of which the screwing device is guided in the direction of the screws. The second linear guide expediently has the same orientation as the screws.

In addition, a setting device can be provided which permits a presetting of the spacing of the screwdriver of the screwing device in relation to the screws. For example, the setting device can be formed by the holder of the crossmember and one of its sides. The holder and the crossmember side can be displaced with respect to one another. In particular, the crossmember side or the holder can have a groove which has substantially the same orientation as the screwdriver.

It has already been indicated above that considerable temperatures occur during operation of the slot die, which temperatures can be of the order of magnitude of from 200° C. to 300° C. Depending on the embodiment of the slot die and, in particular, its die gap, constructions can be required, in which the crossmember is not arranged to the side, but rather above the slot die and/or very close to the slot die. To this extent, it is considered to be particularly advantageous if the crossmember has a lateral holder which is arranged in such a way that the screwing device can be moved laterally as far as beyond the slot die. In particular, it can be provided that, in its rest position (this can be the starting position), the screwing device is situated to the side of the slot die. As a result, temperature-sensitive components of the screwing device are protected and the reliability is increased considerably. The spacing can be produced by the fact that the first and optionally the second holding device are arranged at a spacing from the slot die. As an alternative or in addition, the guide device is configured to be so long that the screwing device can be moved as far as beyond the side of the slot die. It is also particularly advantageous if the spacing of the holder in its end position from the slot die is at least so great that the screwing device is arranged to the side of the slot die in the lateral rest position.

With regard to the method, in order to achieve the object which was stated at the outset, a method for setting up an apparatus for producing flat-web products is proposed according to the invention, which method has the following steps:
the spacing of the screws is determined in the cold state;
the coefficient of thermal expansion of the apparatus is defined over its width;
a starting position of the screwing device is fixed;
the screw spacing in the operating state is defined from the screw spacing in the cold state and the coefficient of thermal expansion;
at the operating temperature of the apparatus, a reference screw is moved to manually by way of the screwing device and its position is detected; and
the remaining screw positions are derived from the detected position of the reference screw.

Surprisingly, the screw spacings in the operating state can be determined very accurately from the coefficient of thermal expansion and the screw spacing in the cold state. The coefficient of thermal expansion is preferably determined in such a way that a screw spacing is measured in the cold state (for example, at room temperature). The screw spacing is subsequently measured in the operating state (which lies, for example, at a temperature from 230° C. to 250° C.). The change in spacing results in the coefficient of thermal expansion which can lie at, for example, from 1500 μm to 2300 μm per meter. It goes without saying that, instead of the screw spacing, other reference values (for example, the width of the slot die) can also be used as the basis for calculation. The measurements can also be carried out at different (operating) temperatures.

The system still functions in an excellent manner even when, for example in the case of a product change, the slot die is operated at a different operating temperature. A reference screw merely has to be fixed and moved to by way of the screwing device, in order that the remaining screw positions can be derived from this fixed position. It has proved to be particularly advantageous here if one of the middle screws is moved to as reference screw. This means that either the middle screw or an adjacent screw is moved to manually. As a result of this measure, any possible error can be kept to a minimum effectively, since the number of "calculated" screw positions which are derived from the reference screw and therefore also any possible error can be kept to a minimum.

In one development of the invention which is essential with reference to the method, it is proposed that a minimum dipping depth is predefined for the screwing device, and that the dipping depth is monitored when moving to the respective screw. This advantageous measure ensures in an extremely effective and simple way that every screw is also actually turned to the predefined extent. If namely a minimum dipping depth is predefined and the screwdriver of the screwing device does not reach this minimum screwing depth, for example because it comes into contact with the screw head, the screwdriver rotates to a minimum extent, in order then to be advanced onto the screw again. This operation is repeated until the screwdriver passes into engagement with the screw. The precise angle of rotation of the screw is recorded.

The advancing of the screwing device onto the screw is monitored, for example, via a position transmitter. As an alternative or in addition, the rotary angle of the screwing device is also monitored. Overall, the system permits a positioning accuracy of approximately ¹⁄₁₀₀ mm.

In the method according to the invention, a regulation operation is used which permits detection of the parameters and control by software.

In the following text, the invention will be explained in greater detail using preferred exemplary embodiments in conjunction with the appended drawing, in which.

FIG. 1 shows a perspective view of an apparatus according to the invention for producing flat-web products, reference being made in the following text to part views 1a to 1d. The apparatus has two essential elements, namely a slot die 1 and a crossmember 2. Plastic or another material which can be liquefied is softened in the slot die 1. The slot die 1 has a die gap 3, through which the liquid plastic exits in the manner of a flat web. A cooling roll (not shown), on which the hot and viscous plastic material cools, can be connected downstream of the slot die.

Figure 1A:
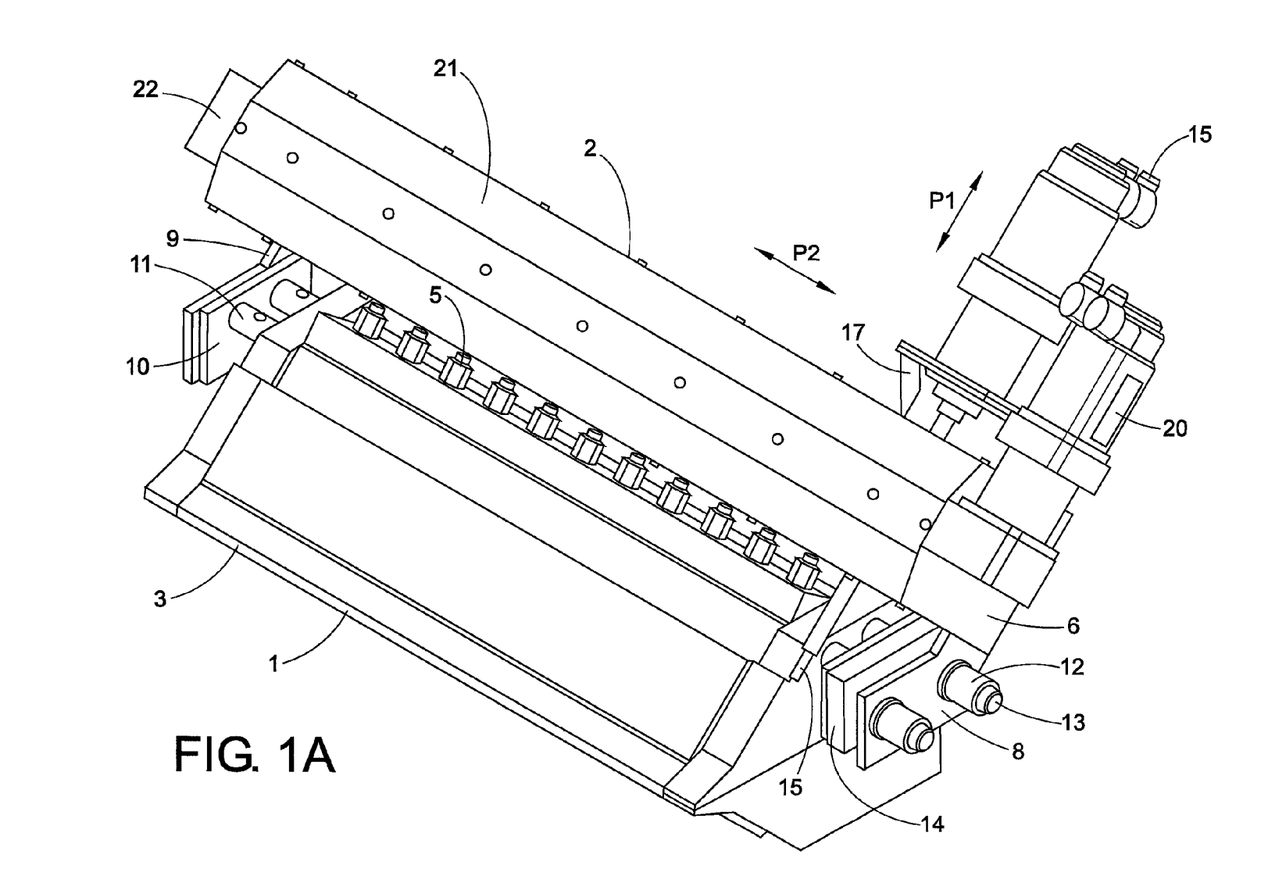
FIG. 1a shows a diagrammatic illustration of a perspective view of a first exemplary embodiment of an apparatus according to the invention.
Figure 1B:
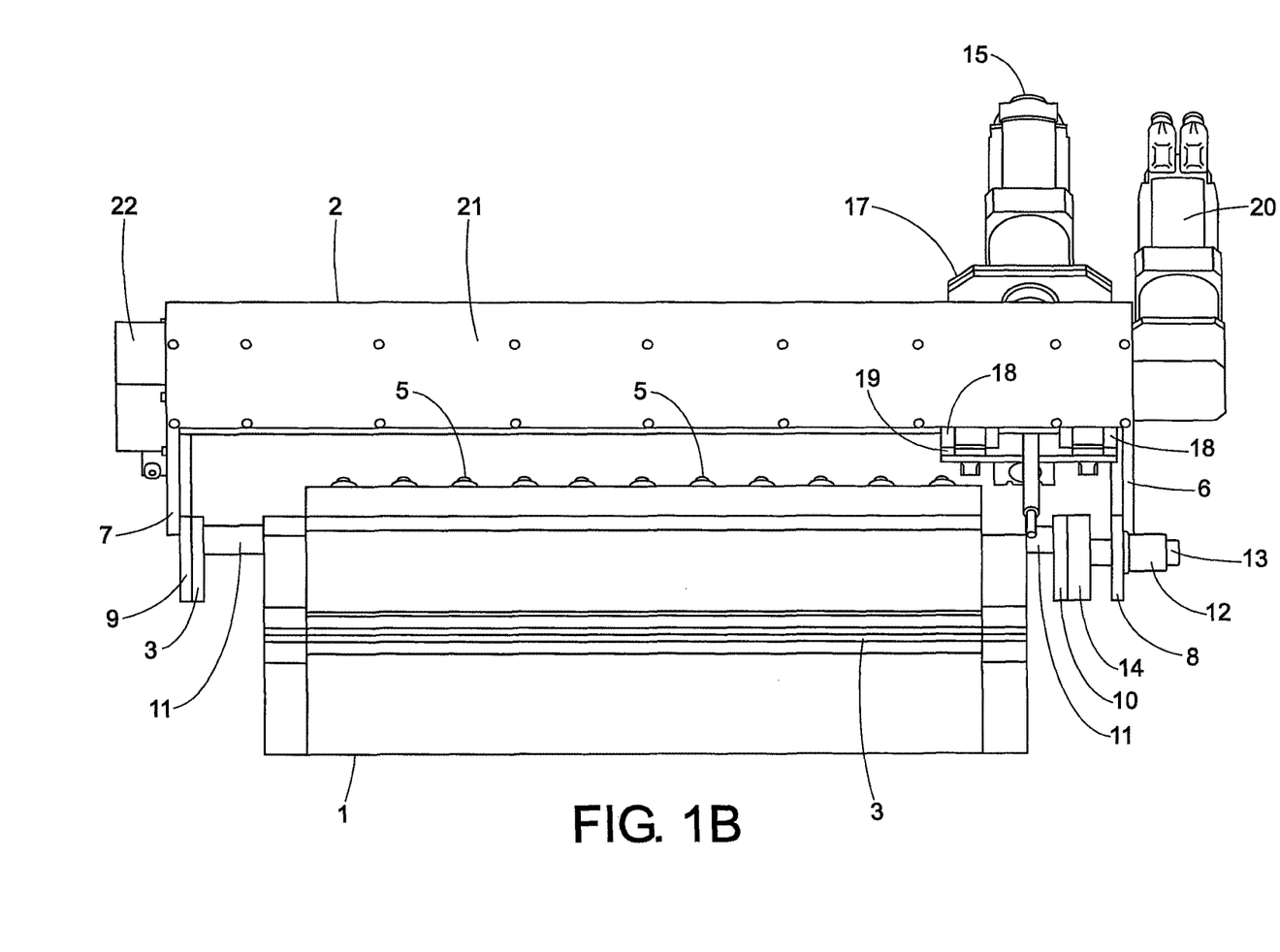
FIG. 1b shows a diagrammatic illustration of a front view of the apparatus according to FIG. 1a, FIG. 1c shows a diagrammatic illustration of a first side view of the apparatus according to FIG. 1a, FIG. 1d shows a diagrammatic illustration of a second side view of the apparatus according to FIG. 1a, FIG. 2a shows a diagrammatic illustration of a plan view of a second exemplary embodiment of an apparatus according to the invention.
Figure 1C:
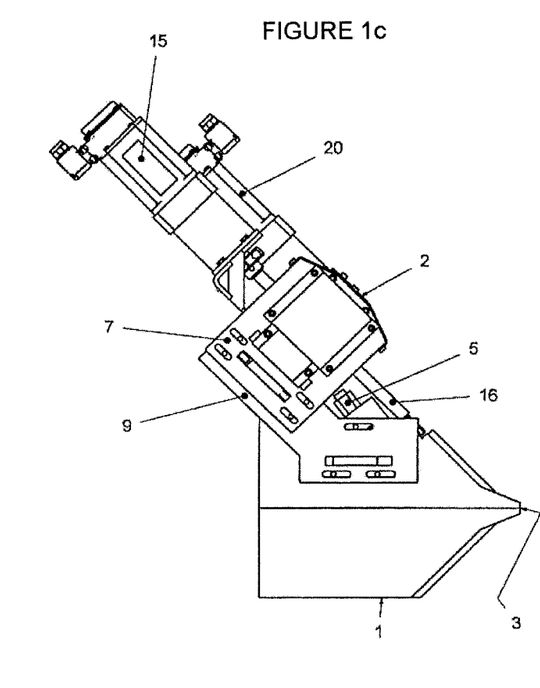
Figure 1D:
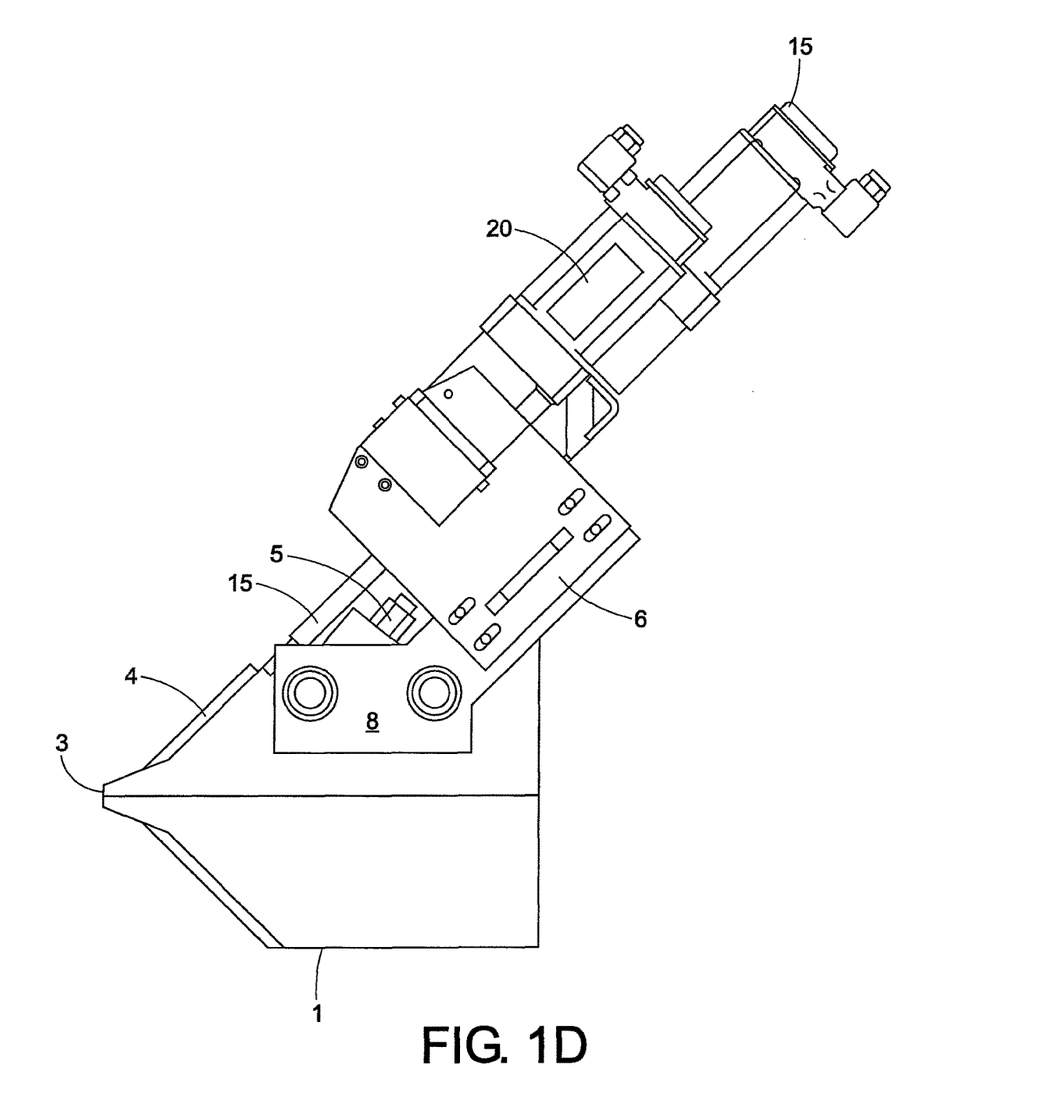

The flow cross section of the die gap 3 can be set, to be precise via screws 4, as are indicated merely in FIG. 1d. The screws 4 extend along the die gap 3 over the entire width of the slot die 1 and typically have a spacing of approximately 25 mm. In addition, a restrictor bar can be arranged in the slot die, which restrictor bar influences the flowing direction of the liquid material within the slot die. The restrictor bar per se is known. It can be set via screws 5. It is noted at this point that, although FIGS. 1a to 1d show nuts, screws are spoken of in the context of the present patent application, which screws are intended to also include the nuts which are shown for setting the restrictor bar in terms of the expression.

The crossmember 2 extends over the entire width of the slot die 1. It has side walls 6, 7 which are connected to holders 8, 9. On the left-hand side in FIG. 1b and FIG. 1a, the crossmember 2 is connected fixedly to the slot die 1 via the holder 9, to be precise via a second holding device 10 which is fixed laterally on the slot die via spacer elements or spacer sleeves 11. The spacer elements or spacer sleeves 11 ensure that the outermost left-hand screw 4 or 5 can also be reached, as will be explained later in further detail.

The second holding device 10 and the holder 9 interact as a setting device. In the released state, they can be displaced with respect to one another. To this end, a tongue and groove connection (not visible) is formed.

In FIG. 1b and FIG. 1a on the right-hand side of the slot die, the holder 8 has a sliding bearing 12, in which bearing journals 13 are guided which for their part are connected fixedly to the second holding device 10 via a first holding device 14 and therefore fixedly to the slot die 1. This means that, in the case of a thermally induced expansion of the slot die 1, no stress occurs between the crossmember 2 and the slot die 1. Rather, a relative movement takes place between the bearing journals 13 and the holder 9 (or its sliding bearings 12), the bearing journals 13 increasingly penetrating the sliding bearings 12 as the lateral expansion of the slot die 1 increases. In addition to the considerable advantage that the crossmember 2 can be held without stress, the crossmember remains, moreover, in a defined position in relation to the slot die 1. This in turn has considerable advantages in the positional accuracy of the screwing device, as will be explained in the following text in further detail.

The screwing device is labelled with the reference sign 15. It has a spanner 16 which is configured in the present case as an external hexagonal spanner, but in principle can be adapted to the screws 4, 5. The screwing device 15 serves to set the screws 4. To this end, the screwing device 15 can be moved in the direction of the arrow P1. The cross section of the die gap 3 is set by way of the screws 4.

The screwing device 15 is seated on a carrier device 17 which is mounted on a carriage 19 such that it can be displaced via linear bearings 18. The carriage 19 can be moved together with the screwing device 15 in the direction of the arrow P2 over the width of the slot die 1.

The screwing device 15 is shown in the right-hand rest position. In this rest position, the screwing device 15 is advantageously situated to the side of the die gap. As a result, the screwing device 15 is protected against overheating. The screwing device is capable of moving to the left in FIG. 1 to such an extent that the outermost screw can also be actuated. To this end, the spacer elements or spacer sleeves 11 are provided.

The carriage 19 is driven by a drive device 20 which interacts with a toothed belt (not visible on account of the base plate 21). The said toothed belt is connected to the carriage 19 and is held in tension by means of a belt tensioning apparatus 22. The screwing device 15 can be oriented very precisely in relation to the screws 4 by the drive device 20.

Figure 2A:
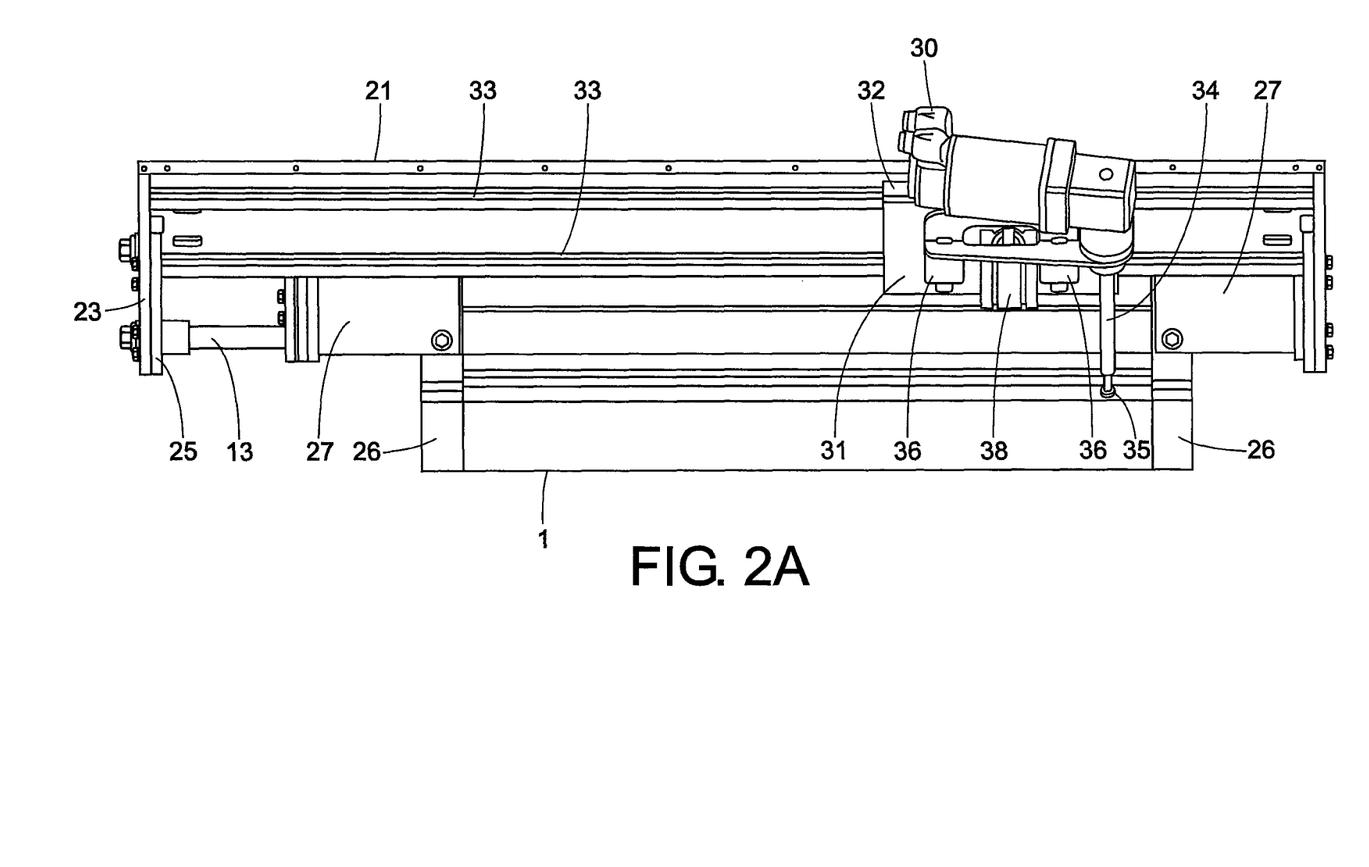
Figure 2B:
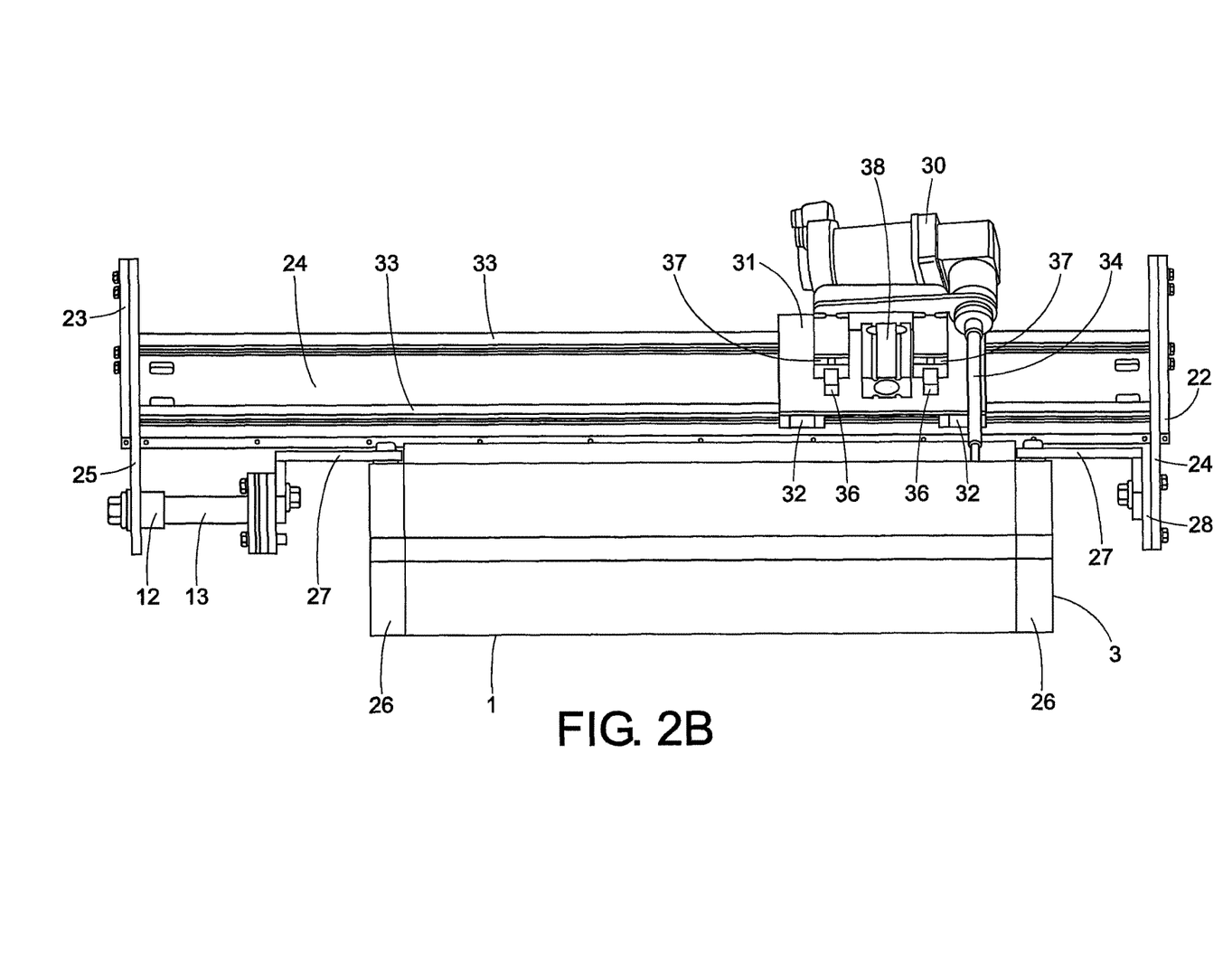
FIG. 2b shows a diagrammatic illustration of a front view of the apparatus according to FIG. 2a, FIG. 2c shows a diagrammatic illustration of a first side view of the apparatus according to FIG. 2a, FIG. 2d shows a diagrammatic illustration of a second side view of the apparatus according to FIG. 2a, and FIG. 3 shows a diagrammatic illustration of a carriage having two screwing devices in an enlarged perspective view.
Figure 2C:
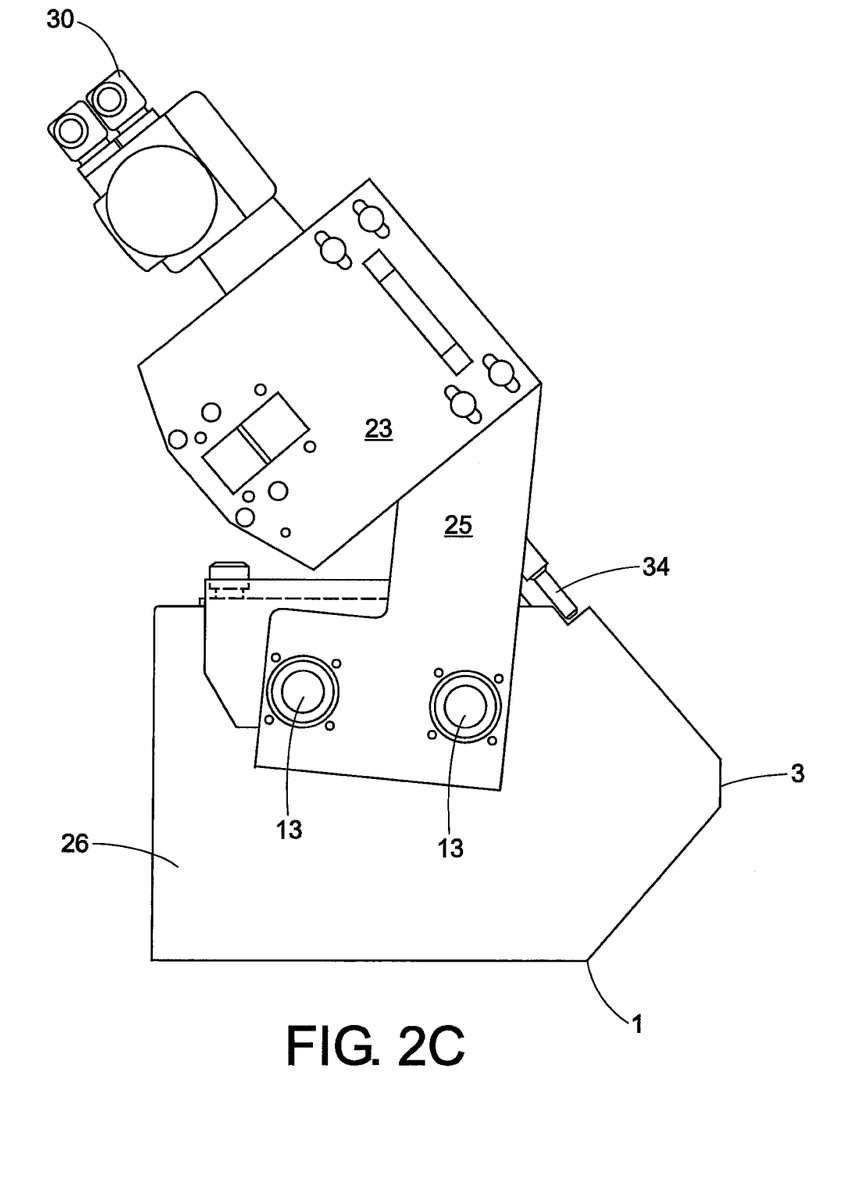
Figure 2D:
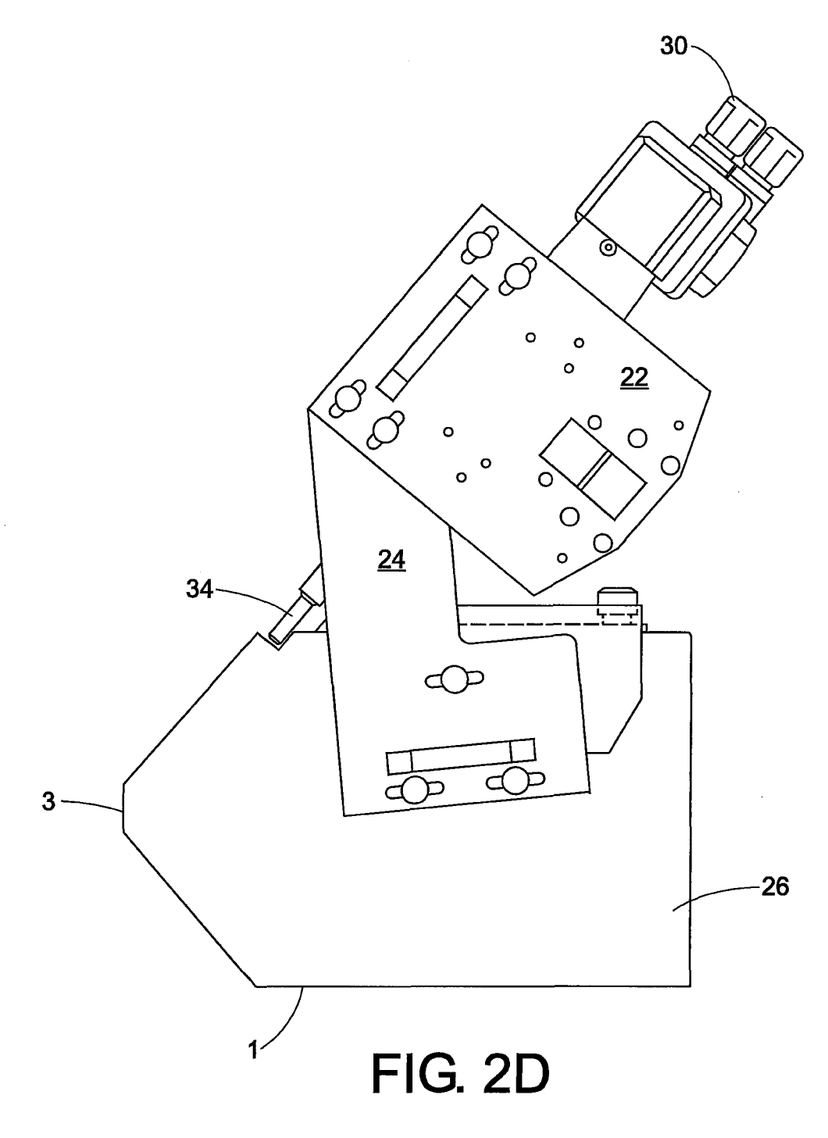

FIG. 2 shows a second exemplary embodiment of the apparatus according to the invention, FIG. 2a showing a plan view, FIG. 2b showing a front view and FIG. 2c and FIG. 2d showing a side view. A horizontal slot die 1 is also shown in the second exemplary embodiment, that is to say a slot die, in which the product exits horizontally out of the gap 3. In an analogous manner to the first exemplary embodiment, the crossmember is labelled with the reference sign 2, the base plate 21 being mirror-inverted with respect to FIG. 1 in the present exemplary embodiment.

Before the second exemplary embodiment is discussed in detail, it is to be noted at this point that slot dies which already exist can be retrofitted with the crossmember according to the invention. This means that, depending on the type of existing slot die, the crossmember and its attachment means have to be adapted to the slot die. To this extent, although the basic construction coincides in each case, the apparatuses according to the invention can differ from one another in the respective concrete refinement.

In the present exemplary embodiment, this applies, for example, to the attachment of the crossmember 2 to the slot die 1. As is also the case in the first exemplary embodiment, the crossmember 2 has in each case one side wall 22, 23. The side walls 22, 23 are fixed on in each case one holder 24, 25, by way of which the crossmember 2 can be fastened to the slot die 1.

The fastening of the crossmember 2 to the slot die 1 differs from the first exemplary embodiment to the extent that the crossmember is not fastened laterally to the side walls of the slot die, but rather is fastened at the top on the respective side wall 26 of the slot die. To this end, spacer elements 27 are screwed onto the slot die 1. In FIG. 2a and FIG. 2b on the right-hand side, the crossmember 2 is fixed in a stationary manner on the slot die 1, to be precise via a holding device 28 which connects the spacer element fixedly to the holder 24, the connection being releasable, as is indicated by the screw 29.

On the other (left-hand) side of the slot die 1 which is shown in FIG. 2a and FIG. 2b, bearing journals are provided which are connected to the spacer element 27. The bearing journals 13 engage through the holder 25 which has in each case one sliding bearing 12 in order to mount the bearing journals. The sliding bearing 12 and bearing journals 13 form a bearing arrangement. In the case of a thermally induced expansion of the slot die 1, a relative movement takes place between the slot die 1 and the crossmember 2, in which relative movement the bearing journals 13 move through the holder 25. Nevertheless, the crossmember 2 remains oriented with respect to the slot die.

The crossmember 2 has a screwing device 30 which can be moved over the width of the crossmember. To this end, the screwing device 30 is mounted on a carriage 31 which has four linear bearings 32 which are in engagement with two rails 33. The rails 33 and the linear bearings 32 form a linear guide for the carriage 31. A toothed belt which is not shown for reasons of clarity is connected to the carriage 31. The same applies to the toothed-belt drive.

The screwing device 30 has a screwdriver 34 for actuating the screws 35 of the die gap 3, of which merely one screw 35 is indicated in FIG. 2a. The screws 35 can be, for example, hexagonal socket screws, into which the screwdriver 34 which is configured as an external hexagon engages.

The screwing device 30 is arranged on the carriage 31 such that it can be moved in the direction of the screws 35. To this end, the screwing device 30 is mounted on a linear guide which has two rails 36 and two linear bearings 37 in the exemplary embodiment which is shown. The advancing of the screwing device takes place via an advancing device which can be configured as a cylinder arrangement 38, in particular as a pneumatic cylinder arrangement. The position of the screwing device 30 is monitored during operation. The same applies to the rotary angle of the screwing device 30. The monitoring takes place in each case by an incremental sensor.

Figure 3:
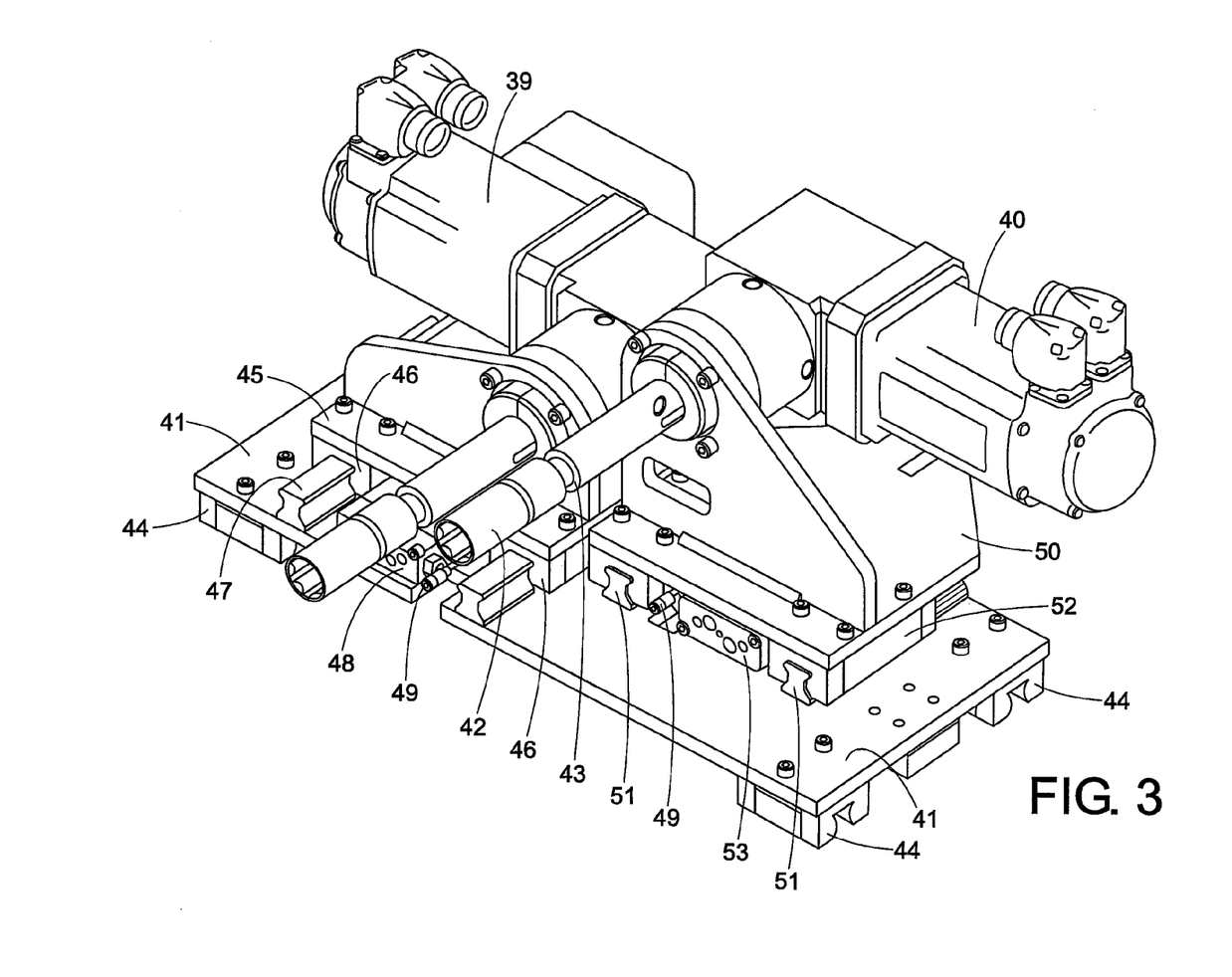

FIG. 3 shows a further exemplary embodiment of an arrangement according to the invention having a first screwing device 39 and a second screwing device 40. This example makes it clear that it is possible, and lies within the scope of the concept of the invention, to arrange two screwing devices 39, 40 on one carriage 41, the first screwing device 39 serving to set the die-gap screws and the second screwing device 40 serving to set the restrictor-bar screws. To this end, the screwing device 40 has a screwdriver 42. The reference sign 43 indicates an optional plug-in device, onto which the screwdriver 42 or any other desired screwdriver can be plugged.

The carriage 41 has linear bearings 44 which interact with rails (not shown here) of the crossmember. By way of the linear guide, the carriage and therefore the two screwing devices 39, 40 can be moved over the width of the slot die.

Both the screwing device 39 and the screwing device 40 can be advanced in the direction of the respective screws. To this end, the screwing device 39 is mounted on a slide 45 which for its part can be moved in a manner which is mounted on rails 47 via linear bearings 46. The slide is actuated via a cylinder arrangement 48 which is preferably operated pneumatically, as is indicated by the connections 49.

In an analogous manner, the screwing device 40 is mounted on a slide 50 which has rails 51 on its underside, which rails 51 are guided in linear bearings 52. The slide is actuated via a cylinder arrangement 53.

In the context of the invention, the expression "supporting device" has been used. This is to be understood to mean, for example, a rail, on which the crossmember is supported by way of a plain or anti-friction bearing. The bearing journal 13 also falls under the expression "supporting device". The supporting device can be a constituent part of the bearing arrangement. The expression "bearing arrangement" is understood in the conventional sense. It preferably has a bearing which can be configured, for example, as a sliding bearing, or else as a possible anti-friction or plain bearing, the bearing preferably forming the bearing arrangement with the supporting device. The supporting device will be assigned as a rule to the slot die. The crossmember is expediently mounted on the supporting device. As an alternative, even if it is more complex, the bearing arrangement is configured in such a way that the supporting device is assigned to the crossmember and the bearing is assigned to the slot die.

LIST OF REFERENCE NUMERALS

1 Slot die
2 Crossmember
3 Die gap
4 Screws
5 Screws
6 Side wall
7 Side wall
8 Holder
9 Holder
10 Holding device
11 Spacer sleeve
12 Sliding bearing
13 Bearing journal
14 Holding device
15 Screwing device
16 Spanner
17 Carrier device
18 Linear bearing
19 Carriage
20 Drive device
21 Base plate
22 Side wall
23 Side wall
24 Holder
25 Holder
26 Side wall
27 Spacer element
28 Holding device
29 Screw
30 Crossmember
31 Carriage
32 Linear bearing
33 Rails
34 Screwdriver
35 Screw
36 Rail
37 Linear bearing
38 Cylinder arrangement
39 Screwing device
40 Screwing device
41 Carriage
42 Screwdriver
43 Plug-in device
44 Linear bearing
45 Slide
46 Linear bearing
47 Rail
48 Cylinder arrangement
49 Connections
50 Slide
51 Rail
52 Linear bearing
53 Cylinder arrangement

The invention claimed is:

1. Apparatus for producing flat-web products, including
a slot die, a gap and/or restrictor bar of which can be set via screws,
at least one screwing device for setting the screws,
a crossmember, on which the at least one screwing device can be moved to and fro, wherein the at least one screwing device is arranged on a carriage which can be moved along a linear guide of the crossmember,
wherein the crossmember is connected fixedly to the slot die on one side of the slot die, and
wherein the apparatus includes at least one bearing arrangement located on the other side of the slot die, wherein the at least one bearing arrangement permits a relative movement between the slot die and the crossmember.

2. Apparatus according to claim 1, characterized in that the at least one bearing arrangement includes at least one supporting device which cooperates with the slot die.

3. Apparatus according to claim 2, characterized in that the at least one supporting device includes a bearing journal, on which the crossmember is movably mounted.

4. Apparatus according to claim 2, characterized in that the at least one supporting device is releasably connected to the slot die.

5. Apparatus according to claim 2, characterized in that the at least one supporting device includes a first holding device which is spaced from the slot die.

6. Apparatus according to claim 5, characterized in that the first holding device interacts with a second holding device which is fixed on the slot die.

7. Apparatus according to claim 6, characterized in that the first holding device can be adjusted with respect to the second holding device.

8. Apparatus according to claim 1, characterized in that the carriage can be driven via a toothed belt, the drive of the toothed belt, being fixed in a stationary manner on the crossmember.

9. Apparatus according to claim 1, characterized in that the carriage includes a second linear guide, by way of which the at least one screwing device is guided in the direction of the screws.

10. Apparatus according to claim 1, characterized in that the crossmember includes a lateral holder which is arranged in such a way that the at least one screwing device can be moved laterally as far as beyond the slot die.

11. An apparatus for producing flat-web products, comprising
 a slot die, wherein a gap and/or restrictor bar of the slot die can be set by at least one screw,
 at least one screwing device for setting the at least one screw,
 a crossmember, on which the at least one screwing device is adapted to be moved laterally,
 wherein the crossmember is fixedly connected to the slot die on one side of the slot die,
 at least one bearing arrangement connected to the other side of the slot die, wherein the at least one bearing arrangement permits a relative movement between the slot die and the crossmember, and
 wherein the at least one screwing device is arranged on a carriage which is adapted to be moved along a linear guide of the crossmember.

12. The apparatus according to claim 11, wherein the at least one bearing arrangement comprises a bearing journal and a sliding bearing.

13. The apparatus according to claim 12, wherein the bearing journal is fixedly mounted to the slot die.

14. The apparatus according to claim 13, wherein the sliding bearing is adapted to slide in relation to the bearing journal.

15. The apparatus of claim 12, wherein the sliding bearing is mounted to a holder spaced from the slot die.

16. The apparatus of claim 15 wherein the holder is fixedly mounted to a side wall to which the crossmember is also fixedly mounted.

* * * * *